United States Patent
Rofougaran

(10) Patent No.: US 8,494,030 B2
(45) Date of Patent: Jul. 23, 2013

(54) METHOD AND SYSTEM FOR 60 GHZ WIRELESS CLOCK DISTRIBUTION

(75) Inventor: Ahmadreza Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 1244 days.

(21) Appl. No.: 12/192,653

(22) Filed: Aug. 15, 2008

(65) Prior Publication Data

US 2009/0316846 A1   Dec. 24, 2009

Related U.S. Application Data

(60) Provisional application No. 61/073,935, filed on Jun. 19, 2008.

(51) Int. Cl.
*H04B 1/38* (2006.01)

(52) U.S. Cl.
USPC .... 375/219; 455/426.1; 455/41.2; 455/67.15; 455/77; 455/84; 375/257

(58) Field of Classification Search
USPC .............. 375/220, 260, 267; 455/8, 15, 25, 455/67.15, 426.1
See application file for complete search history.

(56) References Cited

U.S. PATENT DOCUMENTS

| | | | |
|---|---|---|---|
| 5,003,622 A | 3/1991 | Ma et al. | |
| 5,015,972 A | 5/1991 | Cygan et al. | |
| 5,798,567 A | 8/1998 | Kelly et al. | |
| 5,861,853 A | 1/1999 | Haub et al. | |
| 5,914,873 A | 6/1999 | Blish | |
| 6,060,433 A | 5/2000 | Li et al. | |
| 6,222,503 B1 * | 4/2001 | Gietema et al. | 343/890 |
| 6,573,808 B1 | 6/2003 | Burin | |
| 6,646,581 B1 | 11/2003 | Huang | |
| 6,809,581 B2 | 10/2004 | Rofougaran et al. | |
| 6,853,257 B2 | 2/2005 | Yonekawa | |

(Continued)

FOREIGN PATENT DOCUMENTS

| | | |
|---|---|---|
| CN | 1716695 | 1/2006 |
| EP | 1146592 | 10/2001 |

(Continued)

OTHER PUBLICATIONS

Perndl, "Monolithic Microwave Integrated Circuits in SiGe:C Bipolar Technology" Dissertation, Nov. 2004.

*Primary Examiner* — Daniel Washburn
*Assistant Examiner* — Eboni Hughes
(74) *Attorney, Agent, or Firm* — Farjami & Farjami LLP

(57) ABSTRACT

Aspects of a method and system for 60 GHz wireless clock distribution may include configuring a microwave communication link established between a first chip and a second chip via a wireline communication bus. The configuration may comprise adjusting beamforming parameters of a first antenna array communicatively coupled to the first chip, and of a second antenna array communicatively coupled to the second chip. The first chip and the second chip may communicate a clock signal via the microwave communication link. The microwave communication link may be routed via one or more relay chips, when the first chip and the second chip cannot directly communicate. Control data may be transferred between the first chip, the second chip, and/or the one or more relay chips, which may comprise one or more antennas. The relay chips may be dedicated relay ICs or multi-purpose transmitter/receivers.

24 Claims, 5 Drawing Sheets

U.S. PATENT DOCUMENTS

| | | |
|---|---|---|
| 7,038,625 B1 | 5/2006 | Taylor |
| 7,081,800 B2 | 7/2006 | He et al. |
| 7,138,884 B2 | 11/2006 | Cheung et al. |
| 7,247,932 B1 | 7/2007 | Lin et al. |
| 7,260,424 B2 | 8/2007 | Schmidt |
| 7,469,152 B2 | 12/2008 | Cetiner et al. |
| 7,974,587 B2 * | 7/2011 | Rofougaran .................... 455/84 |
| 2002/0039026 A1 | 4/2002 | Stroth et al. |
| 2004/0041732 A1 | 3/2004 | Aikawa et al. |
| 2004/0150483 A1 | 8/2004 | Cho |
| 2004/0150554 A1 | 8/2004 | Stenger et al. |
| 2004/0201526 A1 | 10/2004 | Knowles et al. |
| 2004/0207405 A1 | 10/2004 | Yang et al. |
| 2004/0222506 A1 | 11/2004 | Wei et al. |
| 2005/0012675 A1 | 1/2005 | Sakiyama et al. |
| 2005/0104665 A1 | 5/2005 | Molnar et al. |
| 2005/0212642 A1 | 9/2005 | Pleskach et al. |
| 2005/0270135 A1 | 12/2005 | Chua et al. |
| 2006/0033671 A1 | 2/2006 | Chan et al. |
| 2006/0091958 A1 | 5/2006 | Bhatti et al. |
| 2006/0092079 A1 | 5/2006 | deRochemont |
| 2006/0152911 A1 | 7/2006 | Humbert et al. |
| 2007/0013051 A1 | 1/2007 | Heyan et al. |
| 2007/0076649 A1 * | 4/2007 | Lin et al. ...................... 370/328 |
| 2007/0139112 A1 | 6/2007 | Bocock et al. |
| 2007/0194911 A1 | 8/2007 | Page |
| 2007/0205748 A1 | 9/2007 | Abou |
| 2008/0048760 A1 | 2/2008 | El Rai et al. |
| 2008/0064341 A1 * | 3/2008 | Shen et al. .................. 455/67.15 |
| 2008/0207200 A1 * | 8/2008 | Fein et al. .................. 455/426.1 |
| 2008/0291115 A1 | 11/2008 | Doan et al. |
| 2009/0047959 A1 * | 2/2009 | Oba et al. ...................... 455/436 |
| 2009/0153260 A1 | 6/2009 | Rofougaran |
| 2009/0153421 A1 | 6/2009 | Rofougaran et al. |
| 2009/0153427 A1 | 6/2009 | Rofougaran |
| 2009/0156157 A1 | 6/2009 | Rofougaran et al. |
| 2009/0157927 A1 * | 6/2009 | Rofougaran .................. 710/106 |
| 2009/0179814 A1 | 7/2009 | Park et al. |
| 2009/0189064 A1 | 7/2009 | Miller et al. |
| 2009/0243741 A1 | 10/2009 | Rofougaran |
| 2009/0243749 A1 | 10/2009 | Rofougaran |
| 2009/0243767 A1 | 10/2009 | Rofougaran |
| 2009/0248929 A1 * | 10/2009 | Rofougaran .................. 710/106 |
| 2010/0090902 A1 | 4/2010 | Thompson et al. |
| 2011/0028103 A1 * | 2/2011 | Rofougaran .................... 455/77 |

FOREIGN PATENT DOCUMENTS

| | | |
|---|---|---|
| JP | 403019358 | 1/1991 |
| KR | 20050065395 | 6/2005 |
| KR | 20060087503 | 8/2006 |
| WO | WO9621255 A1 | 7/1996 |
| WO | WO2007114620 | 10/2007 |

* cited by examiner

METHOD AND SYSTEM FOR 60 GHZ WIRELESS CLOCK DISTRIBUTION

CROSS-REFERENCE TO RELATED APPLICATIONS/INCORPORATION BY REFERENCE

This application makes reference to, claims priority to, and claims the benefit of U.S. Provisional Application Ser. No. 61/073,935, filed on Jun. 19, 2008.

This application also makes reference to:
U.S. application Ser. No. 11/954,361, filed on Dec. 12, 2007;
U.S. application Ser. No. 12/056,865, filed on Mar. 27, 2008.

Each of the above referenced applications is hereby incorporated herein by reference in its entirety.

FIELD OF THE INVENTION

Certain embodiments of the invention relate to communication systems. More specifically, certain embodiments of the invention relate to a method and system for 60 GHz wireless clock distribution.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

Currently, there are many different communication technologies and protocols, some of which may utilize common data formats and while others may utilize different data formats. Today's mobile communication devices have to support these many different communication technologies, protocols and/or data formats.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for 60 GHz wireless clock distribution, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for 60 GHz wireless clock distribution. Aspects of a method and system for 60 GHz wireless clock distribution may comprise configuring a microwave communication link established between a first chip and a second chip via a wireline communication bus. The configuration may comprise adjusting beamforming parameters of a first antenna array communicatively coupled to the first chip, and a second antenna array communicatively coupled to the second chip. The first chip and the second chip may communicate a clock signal via the microwave communication link. The microwave communication link may be routed via one or more relay chips in instances when the first chip and the second chip cannot directly communicate with each other. Control data may be transferred between the first chip, the second chip, and/or the one or more relay chips, which may comprise one or more antennas. The relay chips may be dedicated relay ICs or multi-purpose transmitter/receivers. The first chip and the second chip may be operable to receive and transmit in the 60 GHz frequency band. The first antenna array and/or the second antenna array may be on an integrated circuit package, or on an integrated circuit of the first chip and/or the second chip, respectively. The first antenna array and the second antenna array may comprise one or more antennas. The beamforming parameters may be adjusted to optimize one or more wireless clock distribution performance metrics.

Figure 1:
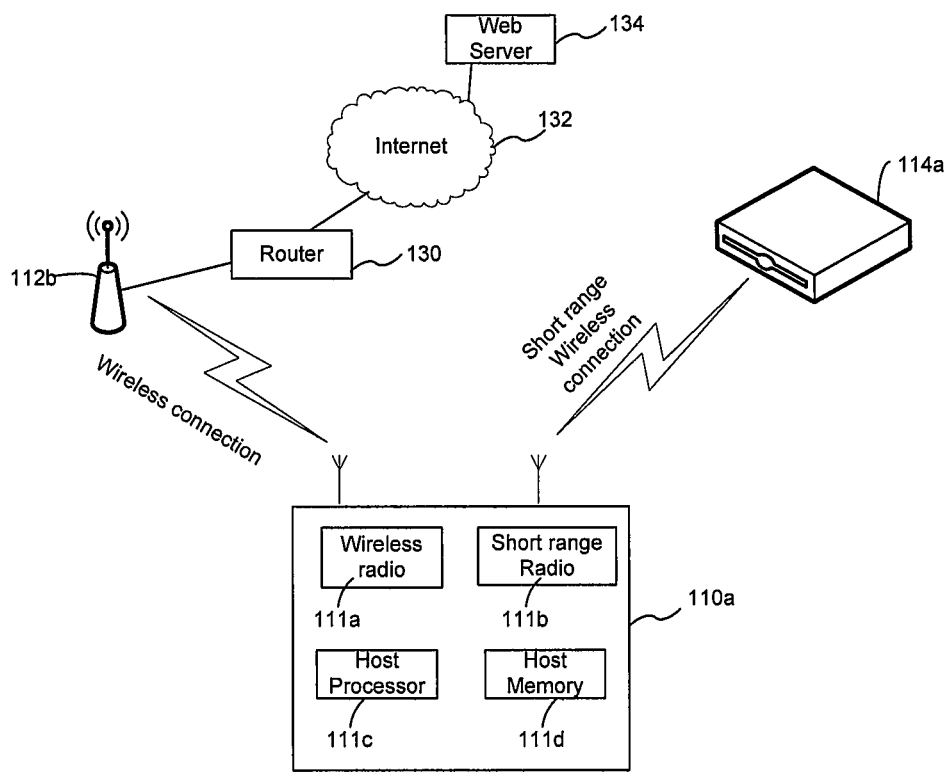
FIG. 1 is a diagram illustrating an exemplary wireless communication system, in accordance with an embodiment of the invention.

FIG. 1 is a diagram illustrating an exemplary wireless communication system, in accordance with an embodiment of the invention. Referring to FIG. 1, there is shown an access point 112b, a computer 110a, a portable storage 114a, a router 130, the Internet 132 and a web server 134. The computer or host device 110a may comprise a wireless radio 111a, a short-range radio 111b, a host processor 111c, and a host memory 111d. There is also shown a wireless connection between the wireless radio 111a and the access point 112b, and a short-range wireless connection between the short-range radio 111b and the portable storage 114a.

The access point 112b may comprise suitable logic, circuitry and/or code that may be enabled to transmit and receive radio frequency signals for data communications, for example with the wireless radio 111a. The access point 112b may also be enabled to communicate via a wired network, for example, with the router 130. The wireless radio 111a may comprise suitable logic, circuitry and/or code that may enable communications over radio frequency waves with one or more other radio communication devices. The wireless radio 111a and the access point 112b may be compliant with one or more mobile communication standard, for example, GSM, UMTS, and CDMA2000. The short range radio 111b may comprise suitable logic, circuitry and/or code that may enable communications over radio frequencies with one or more other communication devices, for example the portable storage 114a. The short range radio 111b and/or the portable storage 114a may be compliant with a wireless industry standard, for example Bluetooth, and IEEE 802.11 Wireless LAN.

The host processor 111c may comprise suitable logic, circuitry and/or code that may be enabled to generate and process data. The host memory 111d may comprise suitable logic, circuitry and/or code that may be enabled to store and retrieve data for various system components and functions of the computer 110a. The router 130 may comprise suitable logic, circuitry and/or code that may be enabled to communicate with communication devices that may be communicatively coupled to it, for example access point 112b or the Internet 132. The Internet 132 may comprise various devices comprising suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it, for example the Internet 132.

Frequently, computing and communication devices may comprise hardware and/or software that may enable communication using multiple wireless communication standards and/or protocols. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

It may be desirable for a user of the computer 110a to access data from the portable storage 114a. Accordingly, the user of the computer 110a may establish a short-range wireless connection with the portable storage 114a. In some instances, a wireless connection between the portable storage 114a and the computer 110a may be using a Bluetooth, IEEE 802.11 Wireless LAN, Ultrawideband, or 60 GHz communications protocol. When the short-range wireless connection is established, and with suitable configurations on the computer 110a enabled, data may be transferred from/to the portable storage 114a. In some instances, the data link between the portable storage 114a and the computer 110a may be enabled for high data rates. In many instances, high data rates may require high frequency clocks at, for example, the components comprised in the computer 110a. High frequency clocks may cause distribution problems due to undesirable clock leakage into circuitry and/or losses associated with wireline distribution, for example attenuation losses and transmission line behavior of conductors. In accordance with various embodiments of the invention, it may be desirable to distribute the clock wirelessly.

Figure 2A:
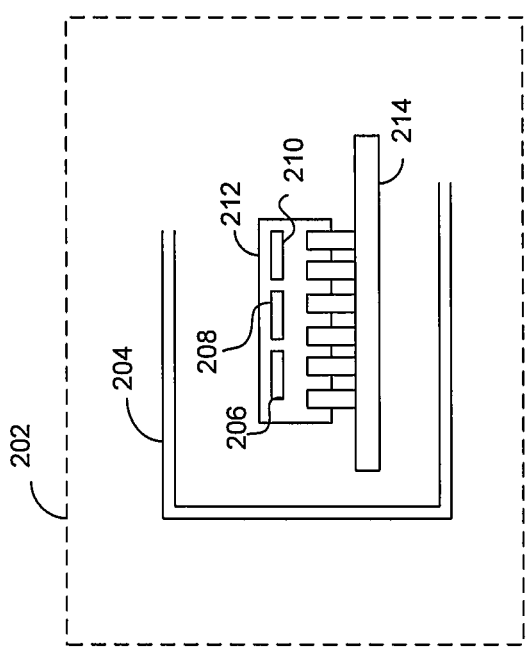
FIG. 2A is a diagram illustrating an exemplary chip-based antenna array, in accordance with an embodiment of the invention.

FIG. 2A is a diagram illustrating an exemplary chip-based antenna array, in accordance with an embodiment of the invention. Referring to FIG. 2A, there is shown a device 202. The device 202 may comprise a casing 204, one or more printed circuit boards (PCBs) 214, and one or more integrated circuits (ICs, chip), of which IC 212 may be illustrated. The IC 212 may comprise one or more antennas, of which antennas 206, 208 and 210 may be illustrated. In some instances, the device 202 may be, for example, a portable storage device.

The IC 212 may comprise suitable logic, circuitry and/or code that may be enabled to generate and/or process radio frequency signals for reception and/or transmission via the one or more antennas, of which antennas 206, 208 and 210 may be illustrated. The antennas 206, 208, and 210 may be used together to form an antenna array. The antennas 206, 208 and 210 may be implemented on the package of the IC 212 and/or directly on the IC 212. In these instances, the chip package may be constructed from radio-wave permeable materials, for example.

In accordance with various embodiments of the invention, a plurality of chips similar to chip 212 illustrated in FIG. 2A may communicate together at high data rates via, for example, 60 GHz wireless links via antenna arrays that may be implemented on and/or in the chip as described above.

In accordance with an embodiment of the invention, one or more communication links may be established between, for example, IC 212 and other chips associated to the device 202. In addition, the antenna array comprising antennas 206, 208, and 210, for example, on the device 202, and the antenna array on a communicating IC may be enabled to automatically steer the transmission and/or reception beam in a direction that may optimize the signal quality and hence the data rates that may be achievable.

Figure 2B:
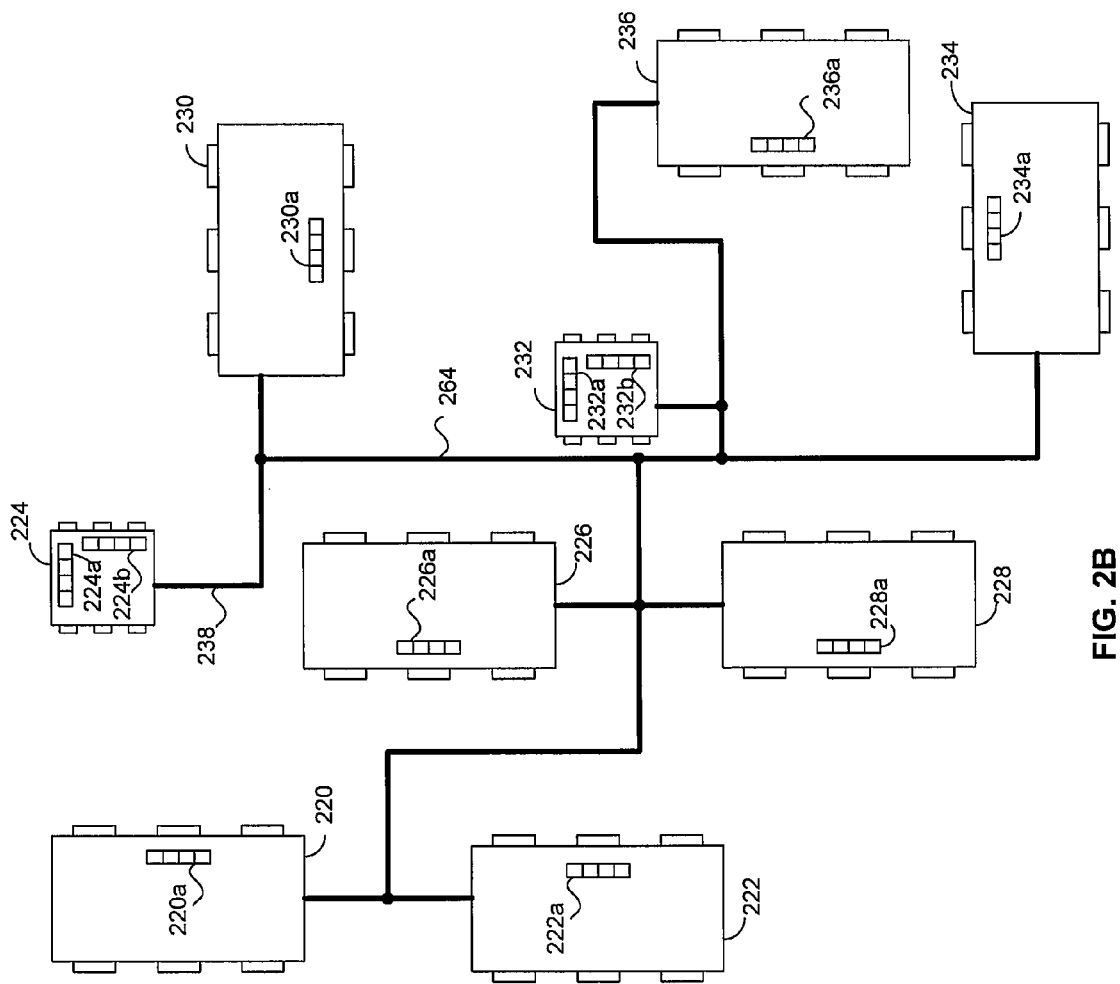
FIG. 2B is a diagram of a 60 GHz inter-chip wireless clock distribution system, in accordance with an embodiment of the invention.

FIG. 2B is a diagram of a 60 GHz inter-chip wireless clock distribution system, in accordance with an embodiment of the invention. Referring to FIG. 2B, there is shown a wireline communication bus 238, ICs 220, 222, 226, 228, 230, 234, and 236. The ICs 220, 222, 226, 228, 230, 234, and 236 may be substantially similar. For example, each of the ICs 220, 222, 226, 228, 230, 234, and 236 may comprise an antenna array 220a, 222a, 226a, 228a, 230a, 234a, and 236a, respectively. The IC 220, for example, may comprise suitable logic, circuitry and/or code that may be enabled to communicate on radio-frequency frequencies via the antenna array 220a, and via the wireline communication bus 238. There is also shown relay ICs 224 and 232. The relay ICs 224 and 232 may be substantially similar. The ICs 224 and 232 may comprise one or more antenna arrays. For example, IC 224 may comprise an antenna array 224a and an antenna array 224b. Similarly, the relay IC 232 may comprise antenna arrays 232a and 232b, for example. The relay IC 232, for example, may comprise suitable logic, circuitry and/or code that may be enabled to communicate a clock signal on radio frequencies via the antenna arrays 224a and 224b, and via wireline communication via the wireline communication bus 238. The ICs 220, 222, 226, 228, 230, 234, and 236 and the relay ICs 224 and 232 may be communicatively coupled to the wireline bus 238. In some embodiments of the invention, one or more of the ICs 220, 222, 226, 228, 230, 234, 236, and/or the relay ICs 224 and 232, may enable the processing of any form of signals such as, for example, multimedia information, comprising, audio, video, and/or data. Audio may comprise voice, any form of music and/or any form of sound. The processing of signals by the ICs 220, 222, 226, 228, 230, 234, 236, and/or the relay ICs 224 and 232 may occur in analog and/or digital format.

The wireline bus 238 may be utilized as a low rate communication bus and as a control signal transport media that may help establish a 60 GHz wireless clock distribution system between a plurality of ICs. For example, it may be desirable for the IC 220 to communicate with the IC 226. Via the wireline bus 238, the IC 220 and/or the IC 226 may initiate a communication session and parameters for a wireless radio connection may be exchanged. When a communication setup phase may be completed, the antenna array 220a on IC 220 may be directed toward the antenna array 226a on IC 226, and a clock signal may be distributed wirelessly. In some instances, one or more ICs may not be able to directly communicate with another IC. For example, it may be desirable for the IC 220 to communicate with the IC 236.

As illustrated in FIG. 2B, in some instances, the IC 236 may not be in a line of sight of the IC 220a because the IC 226 and the relay IC 232, may be obstructing a direct wireless link from IC 220 to IC 236. In such instances, the wireless clock signal may be routed via relay ICs. The relay ICs, for example the ICs 224 and 232 may be enabled to receive a wireless clock signal from one chip and forward it to another chip. For example, the IC 220 may transmit to the IC 236 via the relay IC 224. In another embodiment of the invention, the IC 220 may communicate with the IC 236 via the relay IC 224 and the IC 232. Similarly, the IC 222 may communicate with the IC 234 via the relay IC 232, for example. In accordance with various embodiments of the invention, the wireline bus 238 may be utilized to exchange control information and/or wireless link setup information.

Figure 2C:
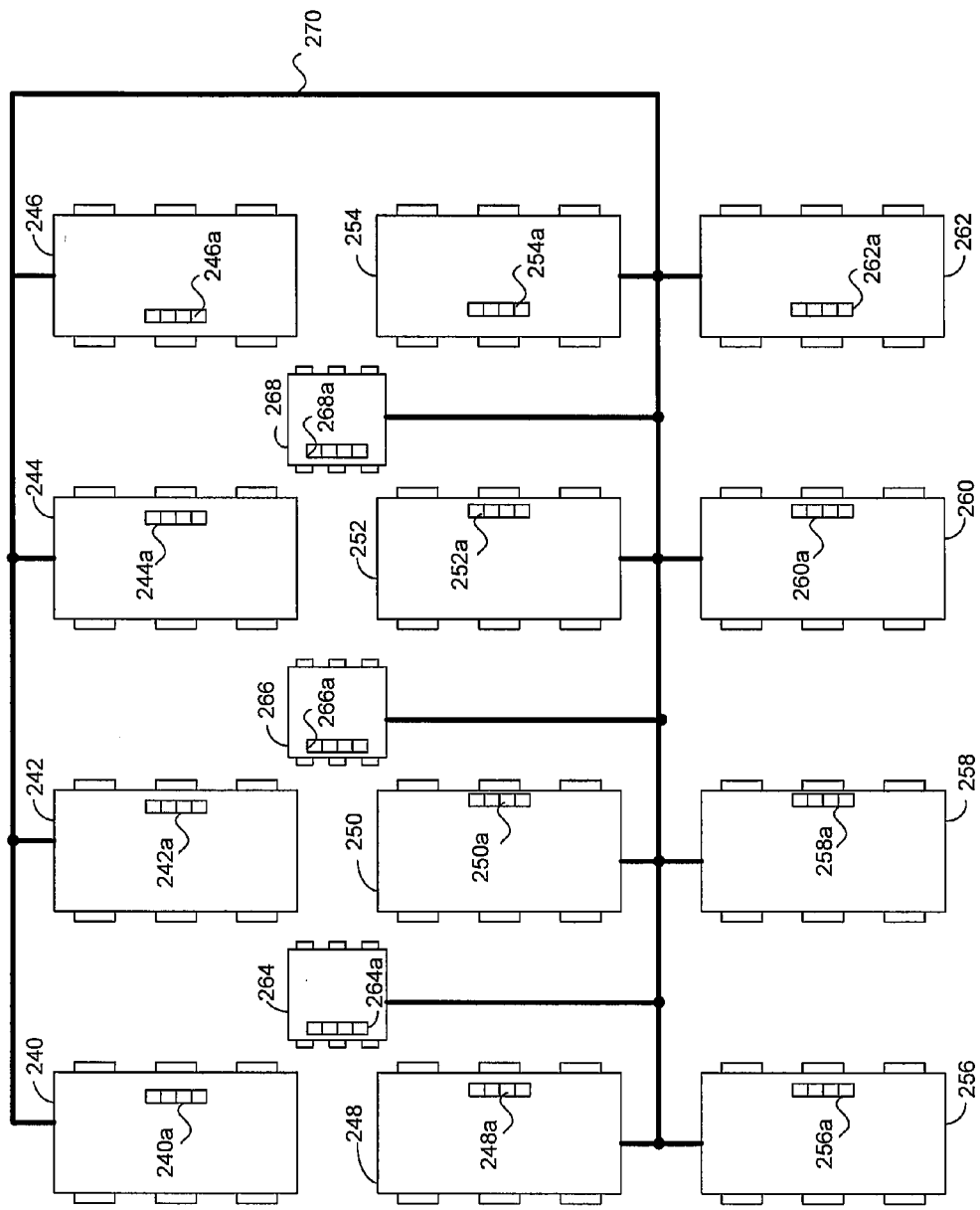
FIG. 2C is a diagram of a 60 GHz inter-chip wireless clock distribution system, in accordance with an embodiment of the invention.

FIG. 2C is a diagram of a 60 GHz inter-chip wireless clock distribution system, in accordance with an embodiment of the invention. Referring to FIG. 2C, there is shown a wireline communication bus 270, ICs 240, 242, 244, 246, 248, 250, 252, 254, 256, 258, 260 and 262. The ICs 240, 242, 244, 246, 248, 250, 252, 254, 256, 258, 260 and 262 may be substantially similar. For example, each of the ICs 240, 242, 244, 246, 248, 250, 252, 254, 256, 258, 260 and 262 may comprise an antenna array 240a, 242a, 244a, 246a, 248a, 250a, 252a, 254a, 256a, 258a, 260a and 262a, respectively.

The IC 240, for example, may comprise suitable logic, circuitry and/or code that may be enabled to communicate on radio-frequency frequencies via the antenna array 240a, and via the wireline communication bus 270. There is also shown relay ICs 264, 266, and 268. The relay ICs 264, 266, and 268 may be substantially similar to IC 240. The relay ICs 264, 266, and 268 may comprise one or more antenna arrays. For example, relay IC 264 may comprise an antenna array 264a. The relay IC 264, for example, may comprise suitable logic, circuitry and/or code that may be enabled to communicate on radio-frequency frequencies via the antenna arrays 264a, and via wireline communication via the wireline communication bus 270. The ICs 240, 242, 244, 246, 248, 250, 252, 254, 256, 258, 260 and 262 and the relay ICs 264, 266, and 268 may be communicatively coupled to the wireline communication bus 270.

Similar to FIG. 2B, the wireline communication bus 270 may be used to exchange control information and setup a 60 GHz wireless clock distribution between a plurality of ICs. In some instances, a regular grid of ICs as illustrated in FIG. 2C may be utilized. As illustrated, because of the wireless links, various embodiments of the invention may comprise a high density of chips since fewer physical connections may be required, for example, on the printed circuit board. For example, it may be desirable for the IC 256 to communicate with the IC 244. The communication parameters may be exchanged via the wireline communication bus 270, and a wireless clock signal distribution may be initialized. In this instance, the IC 256 may steer its antenna array 256a toward the relay IC 264. The relay IC 264 may relay a wireless clock signal from the IC 256 via the relay IC 266 and/or the relay IC 268. In accordance with various embodiments of the invention, the relay ICs may be dedicated relay chips and/or multi-purpose transmitter/receiver chips that may be enabled to initiate wireless clock distribution on their own.

Figure 3:
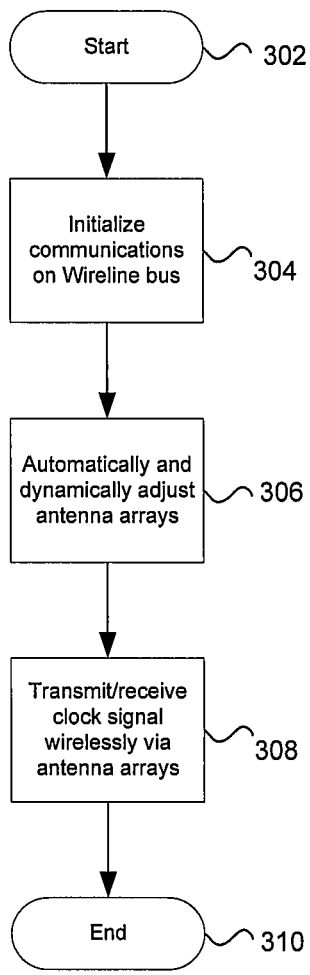
FIG. 3 is a flow chart illustrating an exemplary wireless clock distribution setup, in accordance with an embodiment of the invention.

FIG. 3 is a flow chart illustrating an exemplary wireless clock distribution setup, in accordance with an embodiment of the invention. The setup process may be initialized in step 302. In step 304, the initial wireless clock distribution setup may be established, for example between the IC 250 and the IC 254, as illustrated in FIG. 2C. In accordance with various embodiments of the invention, the initialization of the communication may be achieved via a wireline bus, for example the wireline communication bus 270, as described for FIG. 2B and FIG. 2C. In step 306, after the connection has been set up, the 60 GHz antenna arrays on the IC, for example IC 250, may automatically and/or dynamically adjust their beam patterns in order to optimize some wireless clock distribution performance parameters. For example, the beams may be adjusted in order to optimize signal strength. In step 308, the transmission and reception of the wireless clock signal through the antenna arrays may take place. In some instances, a plurality of communicating ICs may be required to transmit and/or receive data via relay ICs, for example relay ICs 264, 266, and 268.

In accordance with an embodiment of the invention, a method and system for 60 GHz wireless clock distribution may comprise configuring a microwave communication link established between a first chip, for example chip 222, and a second chip, for example 234, via a wireline communication bus 238. The configuration may comprise adjusting beamforming parameters of a first antenna array, for example 222a, communicatively coupled to the first chip 222, and a second antenna array, for example 234a, communicatively coupled to the second chip 234. The first chip, for example chip 222, and the second chip, for example chip 234, may communicate a clock signal via said microwave communication link, as described in FIG. 2B and FIG. 2C. The microwave communication link may be routed via one or more relay chips, for example relay chip 232, when the first chip, for example chip 222, and the second chip, for example chip 234, cannot directly communicate. Control data may be transferred between the first chip 222, the second chip 234, and/or the one or more relay chips, for example relay chip 232, which may comprise one or more antennas, for example antennas 232a and 232b. The relay chips may be dedicated relay ICs or multi-purpose transmitter/receivers. The first chip and the second chip may receive and transmit in the 60 GHz frequency band. The first antenna array and/or the second antenna array may be on an integrated circuit package, or on an integrated circuit of the first chip and/or the second chip, respectively, as illustrated in FIG. 2A, for example. The first antenna array and the second antenna array may comprise one or more antennas. The beamforming parameters may be adjusted to optimize a wireless clock distribution performance metric.

Another embodiment of the invention may provide a machine-readable storage, having stored thereon, a computer program having at least one code section executable by a machine, thereby causing the machine to perform the steps as described herein for a method and system for 60 GHz wireless clock distribution.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
   in a first chip:
   configuring a first wireless link established between said first chip and a second chip by communicating messages over a wireline communication bus that directly connects said first chip and said second chip;
   configuring a second wireless link established between said first chip and a third chip by communicating messages over said wireline communication bus that directly connects said first chip and said third chip; and
   relaying a clock signal from said third chip to said second chip via said first wireless link and said second wireless link.

2. The method according to claim 1, comprising performing said relaying when said third chip and said second chip cannot directly communicate.

3. The method according to claim 2, wherein said messages communicated over said wireline communication bus that directly connects said first chip and said second chip, and said messages communicated over said wireline communication bus that directly connects said first chip and said third chip comprise control data.

4. The method according to claim 2, wherein said first chip comprises one or more antennas.

5. The method according to claim 2, wherein said first chip is a dedicated relay IC.

6. The method according to claim 2, wherein said first chip is a multi-purpose transmitter/receiver.

7. The method according to claim 1, wherein said first wireless link and said second wireless link operate in the 60 GHz frequency band.

8. The method according to claim 1, wherein configuring said first wireless link comprises adjusting beamforming parameters of a first antenna array communicatively coupled to said first chip, and of a second antenna array communicatively coupled to said second chip.

9. The method according to claim 8, wherein said first antenna array is on an integrated circuit package, or on an integrated circuit of said first chip.

10. The method according to claim 8, wherein said second antenna array is on an integrated circuit package, or on an integrated circuit of said second chip.

11. The method according to claim 8, wherein said first antenna array and said second antenna array each comprise a plurality of antennas.

12. The method according to claim 8, comprising adjusting said beamforming parameters to optimize a wireless clock distribution performance metric.

13. A system, the system comprising:
    one or more circuits for use in a first chip, said first chip being directly connected to a second chip via a wireline communication bus, said first chip being directly connected to a third chip via a wireline communication bus, and said first chip being operable to:
    configure a first wireless link established between said first chip and said second chip by communicating messages over said wireline communication bus that directly connects said first chip and said second chip;
    configure a second wireless link established between said first chip and said third chip by communicating messages over said wireline communication bus that directly connects said first chip and said third chip; and
    relay a clock signal from said third chip to said second chip via said first wireless link and said second wireless link.

14. The system according to claim 13, wherein said one or more circuits perform said relaying when said third chip and said second chip cannot directly communicate.

15. The system according to claim 14, wherein said messages communicated over said wireline communication bus that directly connects said first chip and
    said second chip, and said messages communicated over said wireline communication bus that directly connects said first chip and said third chip comprise control data.

16. The system according to claim 14, wherein said first chip comprises one or more antennas.

17. The system according to claim 14, wherein said first chip is a dedicated relay chip.

18. The system according to claim 14, wherein said relay chip is a multi-purpose transmitter/receiver.

19. The system according to claim 13, wherein said first wireless link and said second wireless link operate in the 60 GHz frequency band.

20. The system according to claim 13, wherein configuring said first wireless link comprises adjustment of beamforming parameters of a first antenna array communicatively coupled to said first chip, and of a second antenna array communicatively coupled to said second chip.

21. The system according to claim 20, wherein said first antenna array is on an integrated circuit package, or on an integrated circuit of said first chip.

22. The system according to claim 20, wherein said second antenna array is on an integrated circuit package, or on an integrated circuit of said second chip.

23. The system according to claim 20, wherein said one or more chips adjust said beamforming parameters to optimize a wireless clock distribution performance metric.

24. A relay device having a wired connection to a plurality of wireless devices, the relay device comprising:
    a processor that operates to configure a plurality of wireless links by communicating messages over the wired connection, each of the plurality of wireless links being established between the relay device and a wireless device in the plurality of wireless devices; and
    a circuit that operates to relay a clock signal from a first wireless device of the plurality of wireless devices to a second wireless device of the plurality of wireless devices via at least two of the plurality of wireless links.

* * * * *